United States Patent
Franklin et al.

(10) Patent No.: US 12,546,763 B2
(45) Date of Patent: Feb. 10, 2026

(54) PROTHROMBIN TIME SENSOR

(71) Applicant: Duke University, Durham, NC (US)

(72) Inventors: Aaron D. Franklin, Cary, NC (US); Nicholas X.D. Williams, Washington, DC (US); Brittani L. Carroll, Durham, NC (US); Steven G. Noyce, Durham, NC (US)

(73) Assignee: Duke University, Durham, NC (US)

( * ) Notice: Subject to any disclaimer, the term of this patent is extended or adjusted under 35 U.S.C. 154(b) by 979 days.

(21) Appl. No.: 17/716,163

(22) Filed: Apr. 8, 2022

(65) Prior Publication Data

US 2022/0326215 A1    Oct. 13, 2022

Related U.S. Application Data

(60) Provisional application No. 63/173,003, filed on Apr. 9, 2021.

(51) Int. Cl.
  *G01N 33/49*    (2006.01)
  *G01N 33/86*    (2006.01)

(52) U.S. Cl.
  CPC ......... *G01N 33/4905* (2013.01); *G01N 33/86* (2013.01)

(58) Field of Classification Search
  CPC .... G01N 33/49; G01N 33/4905; G01N 33/86; G01N 33/5438
  USPC ........ 422/73, 82.01, 82.02; 436/63, 69, 149, 436/150, 151
  See application file for complete search history.

(56) References Cited

U.S. PATENT DOCUMENTS

| | | | |
|---|---|---|---|
| 6,673,622 B1 * | 1/2004 | Jina ........................ | G01N 33/86 422/403 |
| 7,021,122 B1 * | 4/2006 | Rosemberg ............ | G01N 11/04 73/304 C |
| 7,235,213 B2 | 6/2007 | Mpock et al. | |
| 9,910,053 B2 | 3/2018 | Bakhru et al. | |
| 2004/0072357 A1 * | 4/2004 | Stiene .............. | A61B 5/150358 422/400 |

(Continued)

OTHER PUBLICATIONS

Williams et al. Biosensors and Bioelectronics, vol. 172, article 112770, Oct. 26, 2020. pp. 1-10.*

(Continued)

*Primary Examiner* — Maureen Wallenhorst
(74) *Attorney, Agent, or Firm* — Michael Best & Friedrich LLP

(57) ABSTRACT

A fully-printed sensor chip for measuring prothrombin time of a blood sample. The sensor chip includes a pair of electrodes and a pair of contact pads, each electrically coupled to a different one of the electrodes, printed on the surface of the substrate using conductive ink materials. When a blood sample is placed on the sample chip in contact with both electrodes, an impedance of the blood sample is determined based on a measured impedance between the two contact pads. As the blood sample clots, the impedance value changes and the prothrombin time for the blood sample is determined based on a measurement time of a maximum impedance value. A resistive bridge printed on the substrate surface between the contact pads increases a baseline measurement for the sensor chip to a value within a range that is measurable by lower-cost measurement equipment.

19 Claims, 6 Drawing Sheets

(56) References Cited

U.S. PATENT DOCUMENTS

2006/0065532 A1* 3/2006 Stiene ............... B01L 3/502715
204/600
2017/0122930 A1 5/2017 Nadkarni et al.

OTHER PUBLICATIONS

Huegen et al. Sensors and Actuators: B. Chemical, vol. 399, article 134785, Oct. 14, 2023, pp. 1-8.*
Abbott, "i-STAT PT/INR Cartridge," <https://www.pointofcare.abbott/us/en/offerings/istat/istat-test-cartridges/PT_INR_coagulation_coumadin_warfarin_monitoring> webpage available as early as Apr. 3, 2020.
Abdalla et al., "Electrical properties with relaxation through human blood," Biomicrofluidics, 2010, 4: 034101, pp. 1-16.
Adib et al., "SnO2 Nanowire-Based Aerosol Jet Printed Electronic Nose as Fire Detector," IEEE Sens. J., 2018, 18(2): 494-500.
Ahn et al., "Omnidirectional Printing of Flexible, Stretchable, and Spanning Silver Microelectrodes," Science, 2009, 323: 1590-1593.
Andrews et al., "Fully Printed and Flexible Carbon Nanotube Transistors for Pressure Sensing in Automobile Tires," IEEE Sens. J., 2018, 18: 7875-7880.
Benjamin et al., "Heart disease and stroke statistics—2018 update: A report from the American Heart Association," Circulation, 2018, 137: e67-e492.
Berney et al., "Impedance Measurement Monitors Blood Coagulation," Analog Dialogue, 2008, 42: 2-4.
Birati et al., "Diagnosis and Management of LVAD Thrombosis," Curr. Treat. Options Cardiovasc. Med., 2015, 17: 2.
Blair et al., "Whole blood clotting tests: an evaluation of five methods," Clin. Lab. Haematol., 1987, 9: 91-94.
Blitz, "Pump thrombosis—A riddle wrapped in a mystery inside an enigma Keynote Lecture Series," Ann. Cardiothorac. Surg., 2014, 3: 450-471.
Braunwald, "The war against heart failure: the Lancet lecture," The Lancet, 2015, 385(9970): 812-824.
Cardenas et al., "Impact of Morphology on Printed Contact Performance in Carbon Nanotube Thin-Film Transistors," Adv. Funct. Mater., 2019, 29: 1-7.
Cardenas et al., "In-Place Printing of Carbon Nanotube Transistors at Low Temperature," ACS Appl. Nano Mater., 2018, 1: 1863-1869.
Cinti et al., "Carbon Black-Modified Electrodes Screen-Printed onto Paper Towel, Waxed Paper and Parafilm M®," Sensors, 2017, 17: 2267, pp. 1-12.
Delgado et al., "Advanced Heart Failure Treated with Continuous-Flow Left Ventricular Assist Device," N. Engl. J. Med., 2009, 361: 2241-2251.
Eckstein, "Aerosol Jet Printed Electronic Devices and Systems," Dissertation, 2016, 210 pages.
Goodall et al., "Aerosolization of Protein Solutions Using Thermal Inkjet Technology," J. Aerosol Med., 2002, 15: 351-357.
Görlinger et al., "Coagulation management in patients undergoing mechanical circulatory support," Best Pract. Res. Clin. Anaesthesiol., 2012, 26: 179-198.
Grady et al., "A clinical evaluation of routine blood sampling practices in patients with diabetes: Impact on fingerstick blood volume and pain," J. Diabetes Sci. Technol., 2014, 8: 691-698.
Gubala et al., "Point of care diagnostics: Status and future," Anal. Chem., 2012, 84(2): 487-515.
Jabari et al., "Micro-scale aerosol-jet printing of graphene interconnects," Carbon N. Y., 2015, 91: 321-329.
Jaques et al., "The Effect of Calcium Concentration on the Prothrombin Time of Dogs Treated with Dicumarol," Am. J. Physiol. Content, 1945, 143: 355-360.
Jones et al., "Aerosol-jet-printed, high-speed, flexible thin-film transistor made using single-walled carbon nanotube solution," Microelectron. Eng., 2010, 87: 434-437.
Jordan et al., "Aerosol-generated sol-gel-derived thin films as biosensing platforms," Anal. Chim. Acta, 1996, 332: 83-91.

Khan et al., "Flexible Hybrid Electronics: Direct Interfacing of Soft and Hard Electronics for Wearable Health Monitoring," Adv. Funct. Mater., 2016, 26: 8764-8775.
Kilic et al., "Dealing with surgical left ventricular assist device complications," Journal of thoracic disease, 2015, 7(12): 2158-2164.
Kirklin et al., "Seventh INTERMACS annual report: 15,000 patients and counting," The Journal of Heart and Lung Transplantation, 2015, 34(12): 1495-1504.
Kreuzer et al., "Management of regional citrate anticoagulation in pediatric high-flux dialysis: Activated coagulation time versus post-filter ionized calcium," Pediatr. Nephrol., 2010, 25: 1305-1310.
Kumar et al., "Scaling Printable Zn—Ag2O Batteries for Integrated Electronics," Adv. Energy Mater, 2019, 1803645, pp. 1-9.
Lee et al., "A Clinical Study of the Coagulation Time of Blood," Am. J. Med. Sci., 1913, 145: 495-503.
Lee et al., "Direct Printing of Capacitive Touch Sensors on Flexible Substrates by Additive E-Jet Printing With Silver Nanoinks," J. Manuf. Sci. Eng., 2017, 139(3): 031011, pp. 1-7.
Lei et al., "Real-Time Electrical Impedimetric Monitoring of Blood Coagulation Process under Temperature and Hematocrit Variations Conducted in a Microfluidic Chip," PLoS One, 2013, 8(10): e76243, pp. 1-7.
Lin et al., "Effectiveness of holographic optical element module sensor in measuring blood prothrombin time," Measurement Science and Technology, 2014, 25(7): 075701, pp. 1-11.
Liu et al., "Fabrication of platinum-decorated single-walled carbon nanotube based hydrogen sensors by aerosol jet printing," Nanotechnology, 2012, 23(50): 505301, pp. 1-7.
Lu et al., "Flexible, Print-in-Place 1D-2D Thin-Film Transistors Using Aerosol Jet Printing," ACS nano, 2019, 13(10): 11263-11272.
Morgan et al., "Gastrointestinal bleeding with the HeartMate II left ventricular assist device," The Journal of heart and lung transplantation, 2012, 31(7): 715-718.
Northoff et al., "Investigation of Prothrombin Time in Human Whole-Blood Samples with a Quartz Crystal Biosensor," Anal. Chem., 2009, 82: 658-663.
Noyce et al., "Electronic Stability of Carbon Nanotube Transistors under Long-Term Bias Stress," Nano Lett., 2019, 19: 1460-1466.
Pan et al., "An ultra-sensitive resistive pressure sensor based on hollow-sphere microstructure induced elasticity in conducting polymer film," Nat. Commun., 2014, 5: 1-8.
Potapov et al., "Patients supported for over 4 years with left ventricular assist devices," European journal of heart failure, 2006, 8(7): 756-759.
Psotka et al., "Home Monitoring is Associated With Fewer Hospital Readmissions Following Left Ventricular Assist Device Implantation," Circulation, 2016, 134(Suppl 1): A17522.
Quick, "Calcium in the Coagulation of the Blood," Am. J. Physiol. Content, 2017, 131: 455-464.
Ramaswamy et al., "Microfluidic device and system for point-of-care blood coagulation measurement based on electrical impedance sensing," Sensors Actuators B Chem., 2013, 180: 21-27.
Roche, "CoaguCheck XS system," <https://diagnostics.roche.com/us/en/products/instruments/coaguchek-vantus.html> webpage available as early as May 30, 2019.
Schwan, "Electrical properties of blood and its constituents: alternating current spectroscopy," Blut, 1983, 46: 185-197.
Seifert et al., "Additive manufacturing technologies compared: Morphology of deposits of silver ink using inkjet and aerosol jet printing," Ind. Eng. Chem. Res., 2015, 54: 769-779.
Shoaie et al., "Highly sensitive electrochemical biosensor based on polyaniline and gold nanoparticles for DNA detection," IEEE Sens. J., 2017, 18: 1835-1843.
Slaughter et al., "Advanced heart failure treated with continuous-flow left ventricular assist device," New England Journal of Medicine, 2009, 361(23): 2241-2251.
Starling et al., "Unexpected Abrupt Increase in Left Ventricular Assist Device Thrombosis," N. Engl. J. Med., 2013, 370: 33-40.
Stewart et al., "Effect of Morphology on the Electrical Resistivity of Silver Nanostructure Films," ACS Appl. Mater. Interfaces, 2017, 9: 1870-1876.

(56) References Cited

OTHER PUBLICATIONS

Strobl et al., "The role of ionized calcium and magnesium in regional citrate anticoagulation and its impact on inflammatory parameters," Int. J. Artif. Organs, 2017, 40: 15-21.

Stulak et al., "Management of Pump Thrombosis in Patients with Left Ventricular Assist Devices," Am. J. Cardiovasc. Drugs, 2015, 15: 89-94.

Svetlichnaya et al., "Abstract 19132: Home Monitoring is Associated With Fewer Gastrointestinal Bleeding Events Following Left Ventricular Assist Device Implantation," Circulation, 2016, 134: A19132.

Tripathi et al., "Clinical evaluation of whole blood prothrombin time (PT) and international normalized ratio (INR) using a Laser Speckle Rheology sensor," Sci. Rep., 2017, 7: 9169, pp. 1-8.

Ts'Ao et al., "Whole-blood clotting time, activated partial thromboplastin time, and whole-blood recalcification time as heparin monitoring tests," Am. J. Clin. Pathol., 1979, 71: 17-21.

Ur, "Analysis and interpretation of the impedance blood coagulation curve," Am. J. Clin. Pathol., 1977, 67: 470-476.

Ur, "Changes in the Electrical Impedance of Blood during Coagulation," Nat. Publ. Gr., 1970, 226: 269-270.

Ur, "Detection of clot retraction through changes of the electrical impedance of blood during coagulation," Am. J. Clin. Pathol., 1971, 56: 713-718.

Valentine et al., "Hybrid 3D Printing of Soft Electronics," Adv. Mater., 2017, 29: 1-8.

Valeri et al., "The Effects of Temperature on Bleeding Time and Clotting Time in Normal Volunteers," Crit. Care Med., 1995, 23: 698-704.

Williams et al., "Aerosol jet printing of biological inks by ultrasonic delivery," Biofabrication, 2020, 12(2): 025004.

Williams et al., "Silver nanowire inks for direct-write electronic tattoo applications," Nanoscale, 2019, 11(30): 14294-14302.

Wilson et al., "Overreliance on Cost Reduction as a Featured Element of Sensor Design," ACS Sensors, 2019, 4: 1120-1125.

Wittkowsky et al., "Barriers to patient self-testing of prothrombin time: National survey of anticoagulation practitioners," Pharmacotherapy, 2005, 25: 265-269.

Wurster, "Patient self-testing for management of anticoagulation therapy: Challenges," J. Thromb. Thrombolysis, 2008, 25: 16-17.

Yang et al., "Design and evaluation of a portable optical-based biosensor for testing whole blood prothrombin time," Talanta, 2013, 116: 704-711.

Yao et al., "Blood coagulation testing smartphone platform using quartz crystal microbalance dissipation method," 2018, Sensors, 18(9): 3073, pp. 1-12.

Zheng et al., "Direct desktop printed-circuits-on-paper flexible electronics," Sci. Rep., 2013, 3: 1-7.

Zilberman-Rudenko et al., "Design and Utility of a Point-of-Care Microfluidic Platform to Assess Hematocrit and Blood Coagulation," Cell. Mol. Bioeng., 2018, 11: 519-529.

Zirkl et al., "An all-printed ferroelectric active matrix sensor network based on only five functional materials forming a touchless control interface," Adv. Mater., 2011, 23: 2069-2074.

Zucker et al., "Some Effects of Divalent Cations on the Clotting Mechanism and the Platelets of EDTA Blood," J. Appl. Physiol., 1958, 12: 453-460.

\* cited by examiner

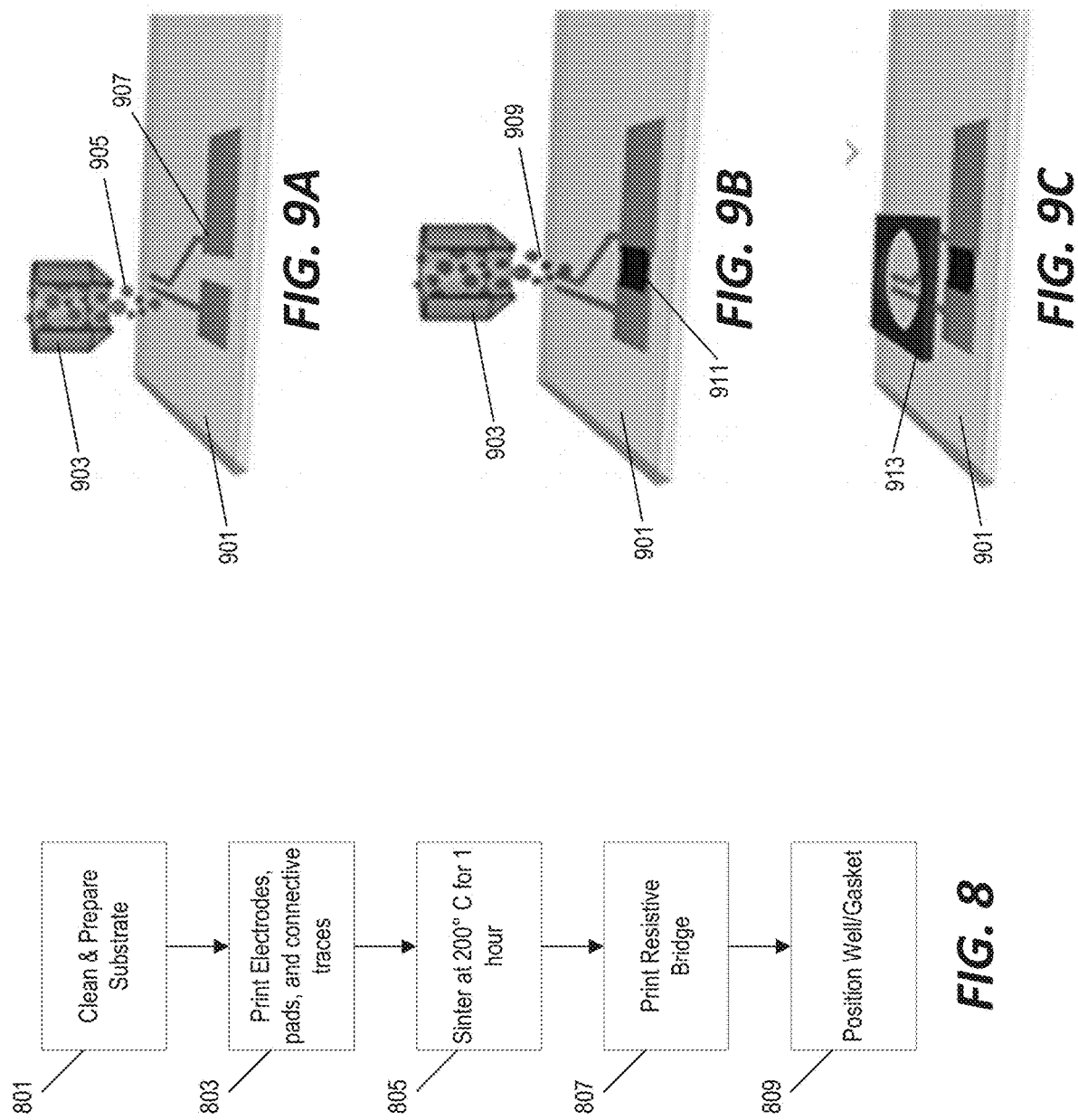

PROTHROMBIN TIME SENSOR

RELATED APPLICATIONS

This application claims the priority benefit of U.S. Provisional Patent Application No. 63/173,003, filed on Apr. 9, 2021 and entitled "HANDHELD POINT-OF-CARE PROTHROMBIN TIME MEASUREMENT WITH PRINTED SENSORS," the entire contents of which is hereby incorporated by reference.

STATEMENT REGARDING FEDERALLY SPONSORED RESEARCH OR DEVELOPMENT

This invention was made with government support under grant numbers 1R21HL141028 and 1R01HL146849 awarded by the National Institutes of Health. The government has certain rights in the invention.

BACKGROUND

The present invention relates to systems and methods for evaluating blood clotting in a blood sample. More specifically, the systems and methods described herein related to mechanisms for measuring how long it takes for a clot to form (i.e., a "prothrombin time").

SUMMARY

In one embodiment, the invention provides a fully-printed sensor chip for use in measuring a prothrombin time of a blood sample. The sensor chip includes a substrate and a circuit arrangement formed of one or more conductive ink materials printed on a surface of the substrate. The circuit arrangement includes a pair of electrodes, a pair of contact pads, and conductive traces coupling each electrode to a different contact pad. When a blood sample is placed on the sample chip in contact with both electrodes, an impedance of the blood sample is determined based on a measured impedance between the two contact pads. The prothrombin time for the blood sample is determined based on a measurement time of a maximum impedance value. In some embodiments, the sensor chip also includes a resistive bridge printed on the substrate surface coupling the first contact pad to the second contact pad. The resistive bridge increases a baseline measurement to a value within a range that is measurable by lower-cost measurement equipment.

In another embodiment, the invention provides a prothrombin time measurement system including an impedance sensor that is selectively couplable to the sensor chip and an electronic controller communicatively coupled to the impedance sensor. The impedance sensor is configured to measure the impedance of the blood sample. The electronic controller evaluates a sequence of impedance measurement values from the impedance sensor to determine a maximum impedance value that is indicative of complete clotting of the blood sample. The electronic controller determines the prothrombin time for the blood sample based on a measurement time corresponding to the maximum impedance value.

In yet another embodiment, the invention provides a method of manufacturing the sensor chip by cleaning and preparing the surface of the substrate, printing circuit components using a first conductive ink material, and then printing a resistive bridge using a second, different conductive ink. The printing is performed on the surface of the substrate using aerosol jet printing. In some implementations, the substrate is a glass substrate material while, in some other implementations, the substrate is a flexible material such as polyimide.

Finally, in still another embodiment, the invention provides a method of measuring a prothrombin time using the sensor chip. A blood sample is applied to the sensor chip in contact with both electrodes. An impedance of the blood is repeated measured by measuring an impedance between the first contact pad and the second contact pad. An impedance data set is generated based on the measured impedance. The impedance data set includes a sequence of chronologically ordered impedance values based on the measured impedance of the blood sample at each of a plurality of different measurement times. The impedance data set is analyzed to identify an impedance value corresponding to a top of an impedance curve for the blood sample. The impedance curve includes a plurality of increasing impedance values while the blood is coagulating and a plurality of decreasing impedance values after the blood has coagulated. The top of the impedance curve is indicative of a completion of the clotting. The prothrombin time for the blood sample is determined based on a measurement time corresponding to the impedance value at the top of the impedance curve for the blood sample. Other aspects of the invention will become apparent by consideration of the detailed description and accompanying drawings.

BRIEF DESCRIPTION OF THE DRAWINGS

FIG. 8 is a flowchart of a method for manufacturing the disposable sensor chip of FIG. 1 using aerosol jet printing (AJP).

FIGS. 9A through 9C are perspective views of the disposable sensor chip of FIG. 1 at various different stages of the manufacturing proceed of FIG. 8.

DETAILED DESCRIPTION

Figure 1:
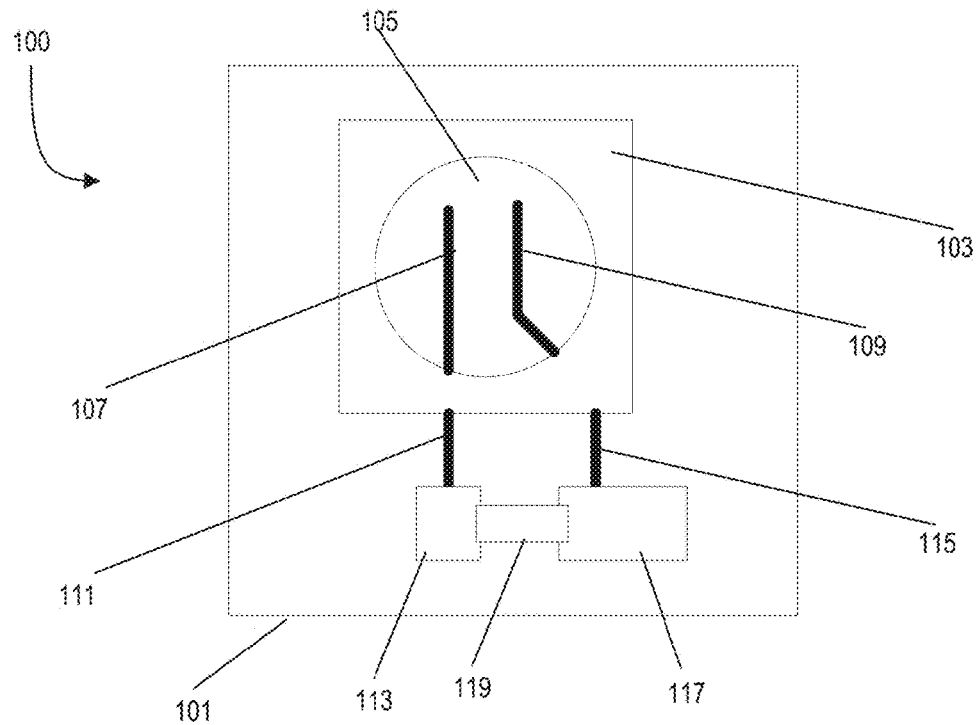
FIG. 1 is an overhead view of a disposable sensor chip for a prothrombin time sensor system according to one implementation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Heart failure is a major public health problem affecting over 6.4 million individuals in the United States alone, with over 550,000 new cases emerging annually. Despite therapeutic advances, the disease frequently becomes refractory to medications and eventually requires long-term mechanical circulatory support with ventricular assist devices (VADs), either as a bridge to transplant or destination therapy. Nearly two decades of clinical experience have shown that VAD support leads to significant improvements in survival, functional status, and quality of life. Despite these successes, the persistence of complications currently limits long-term outcomes. In particular, the thrombogenic nature of VAD therapy requires long-term anticoagulation treatment, most commonly with the blood thinner warfarin. While this reduces the risk of complications that may arise from activation of the coagulation cascade (the most feared being pump thrombosis), chronic anticoagulation inevitably risks bleeding events, which are the most common complication associated with VADs. Periodic blood-based testing is therefore required to measure patients' prothrombin time/international normalized ratio (PT/INR) values to ensure that warfarin levels are within the therapeutic window, which reflect the clotting tendency of blood and hence the extent of anticoagulation.

Earlier identification of potential complications leads to better outcomes, which is the basis for frequent and scheduled monitoring of PT/INR. Monitoring typically occurs once every 1-4 weeks, requiring clinic visits in the outpatient setting to obtain blood via venipuncture for testing in centralized laboratories, which is burdensome and costly to the patient. Yet, due to warfarin's narrow therapeutic window and the unique hematological changes induced by VADs over time, from a management perspective it is possible that patients may benefit from more frequent testing intervals. Patient self-testing of PT/INR at home using point-of-care tests (POCTs) could improve outcomes for VAD patients. However, at-home self-testing is often not practical due to the high cost associated with the devices and reagent cartridges as well as inconsistencies in device performance.

In some implementations, examples described herein provide portable, low-cost, facile, and accurate surveillance of PT/INR and, in some cases, may provide significant benefit in the chronic management of advanced heart failure patients on VAD support. In various examples, the systems described herein provide and utilize an electrically transduced sensor to capture a very low frequency (VLF) impedance measurement of a patient's blood sample (e.g., "finger stick blood") in an in-home and/or point-of-care (POC) environment. Furthermore, in some implementations, the device described in the examples below utilized "printed electronics" in which some or all of the electronic circuit components of the device are printed onto a substrate (thus circumventing the need for cleanroom processing). In some examples, aerosol jet printing (AJP) is utilized. AJP techniques are able to print on non-planar surfaces, print using high-aspect ratio inks (allowing for the printing of conductive traces at low printing temperatures), and print inks with a broad range of viscosities. AJP functions by aerosolizing ink in an enclosed cartridge using ultrasonic transduction. The aerosolized ink is then delivered to the printer nozzle and eventually the substrate surface by flowing inert gases.

In some implementations, the systems and methods described herein below include and utilize a sensor chip component that interacts with a computing device. In some implementations, the sensor chip is disposable and so the computing device operates to measure PT/INR each time using a different selectively interchangeable disposably sensor chip. In some implementations, the sensor chip includes electrodes printed onto a flexible substrate (e.g., a polyimide substrate) and, in other implementations, the sensor chip includes electrodes printed on a rigid substrate (e.g., a glass slide). In some implementations, the computing device is communicatively coupled to the sensor chip and operates to measure a sequence of impedance values as the blood sample on the sensor chip coagulates. In some implementations, the operating frequency of the impedance measurements is 15 kHz, which has been demonstrated in some examples to provide consistent clotting time measurements for both animal and human blood (lending credence to the ability of this mechanism to function as a broad testing platform). In some implementations, a handheld sensor device is provided with low-cost electronics that provide measurement accuracy to within a standard deviation of other costly, stationary, computer-based testing systems for measuring PT/INR. In some implementations, these results provide a fully printed impedimetric coagulometer, which addresses the unmet need for a low-cost, robust POC device, potentially improving outcomes for VAD patients (and other populations on chronic warfarin) by early detection of derangements in PT/INR.

FIG. 1 illustrates an example of a sensor chip 100 for use in an impedimetric coagulometer system. In some implementations, the sensor chip is disposable and, accordingly, is selectively couplable and interchangeable as described in further detail below. The sensor chip 100 is formed on a glass substrate 101. A silicon gasket 103 includes an opening 105 such that, when the gasket 103 is affixed to the glass substrate 101, the opening 105 forms a well in which a blood sample is held during testing/measurement. A pair of electrodes 107, 109 are printed on the surface of the glass substrate 101 in the area of the opening 105 such that the blood sample within the well contacts the electrodes 107, 109. A first conductive trace 111 is also printed on the glass slide 101 coupling the first electrode 107 to a first contact pad 113. A second conductive trace 115 is printed on the glass slide 101 and electrically couples the second electrode 109 to a second contact pad 117. In some implementations, in order to avoid electrical current measurement range limitations of a computer-tied measurement system, a resistive bridge 119 may also be printed on the glass slide 101 coupling the first contact pad 113 to the second contact pad 117.

As described in further detail below, in some implementations, the electrode 107 and the first conductive trace 111 are printed as a single conductive trace on the surface of the glass slide 101 before the gasket is affixed thereto and, when the gasket is affixed to the glass slide 101, the portion of the electronic trace that is positioned within the well 105 functions as the first electrode 107. Similarly, in some implementations, the second electrode 109 and the second conductive trace 115 are also printed as a single conductive trace on the surface of the glass slide 101 before the gasket is affixed thereto. Additionally, in some implementations, the first contact pad 113 and the second contact pad 117 are printed on the surface of the glass slide 101 using the same conductive "ink" as is used to print the conductive traces.

In some implementations, the electrodes 107, 109, the conductive traces 111, 115, and the contact pads 113, 117 are formed of silver nanoparticles (AgNP) affixed to the surface of the glass slide 101 and, as described further below, may be formed by printing on the glass slide 101 using an AgNP "ink." In some implementations, the resistive bridge 119 is formed of either silver nanowires (AgNWs) or unsorted carbon nanotubes (CNTs) affixed to the surface of the glass slide 101 and, as described further below, may be formed by printing on the glass slide 101 using an AgNW ink or a CNT ink.

Figure 2:
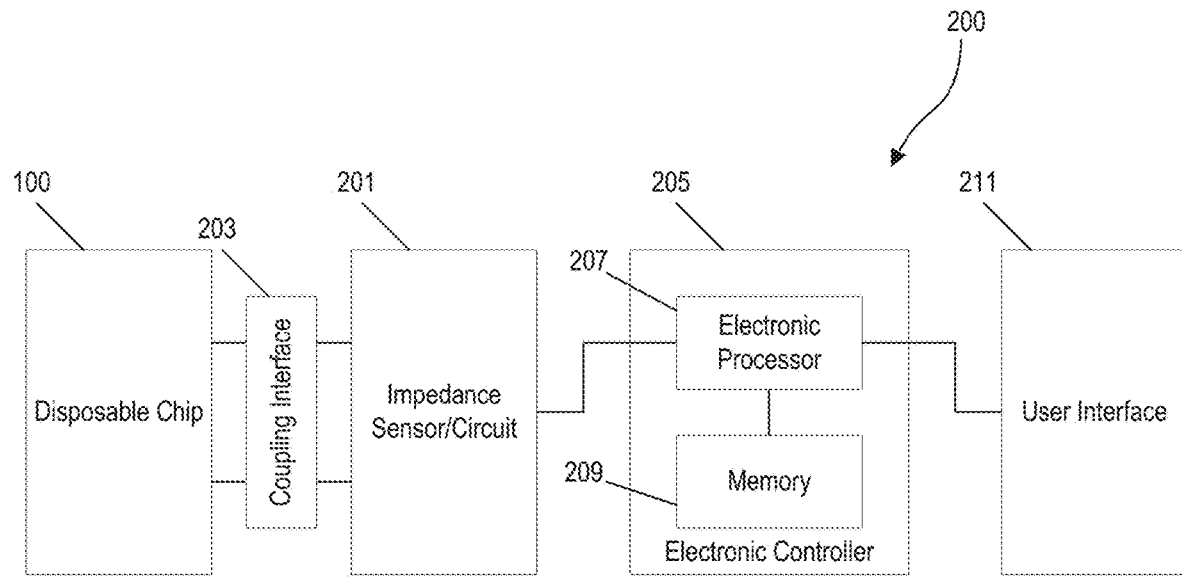
FIG. 2 is a block diagram of a prothrombin time sensor system utilizing the disposable sensor chip of FIG. 1.

FIG. 2 illustrates an example of a prothrombin time measurement system 200 utilizing the disposable sensor chip 100 of FIG. 1. The disposable chip 100 is selectively and interchangeably coupled to an impedance sensor/circuit 201 by a coupling interface 203. In some implementations, the coupling interface 203 includes an opening in a device housing sized to receive all or part of the disposable chip 100 and a pair of spring contacts positioned to align with the contact pads 113, 117 of the disposable chip 100 when the disposable chip 100 is inserted into the opening of the device housing. In some implementations, the spring contacts are biased downward relative to the top surface of the disposable chip 100 such that, when the disposable chip 100 is inserted into the opening, the spring contacts are displaced and electrical contact between the spring contacts of the coupling interface 203 and each of the contact pads 113, 117 of the disposable chip 100 are maintained by the downward bias of the spring contacts of the coupling interface 203.

The impedance sensor 201 is communicatively coupled to an electronic controller 205. In some implementations, the electronic controller 205 includes an electronic processor 207 and a non-transitory, computer-readable memory 209. The memory 209 stores data (e.g., impedance measurements) and instructions that, when accessed and executed by the electronic processor 207, provides the functionality of the prothrombin time measurement system 200 (e.g., including the functionality described herein). In some implementations, the electronic controller 205 operates the impedance sensor/circuit 201 to periodically measure an impedance of a blood sample within the well 105 of the disposable chip 100 (e.g., as described below in reference to the example of FIG. 3) while, in some other implementations, the impedance sensor/circuit 201 may be configured to operate independently of the electronic controller 205 to measure the impedance of the blood and to then transmit the impedance measurements to the electronic controller (e.g., sequentially as they are measured or as a "batch" after a measurement time period has expired).

Finally, the system 200 includes a user interface 211 that is communicatively coupled to the electronic controller 205 and is configured to receive user inputs and to display measurement data, instructions for use, and/or operating status indicators to the user on a display screen. In some implementations, the user interface 211 is provided as a touch-sensitive display screen (i.e., a "touch screen").

In some implementations, such as in the example of FIG. 2, the system 200 includes a single electronic controller 205 that operates both the impedance sensor/circuit 201 and the user interface 211. However, in other implementations, the impedance sensor/circuit 201 and/or the user interface 211 may include their own separate electronic controller. In some such implementations, the system 200 may still include a "primary" electronic controller 205 configured to communicate with the impedance sensor/circuit electronic controller and/or the user interface electronic controller. For example, the electronic controller of the impedance circuit 201 may be configured to measure impedance values of the blood sample and to provide the measured outputs to the primary electronic controller 205, which, in turn, processes the measurement data in order to detect the prothrombin time of the blood sample. Similarly, in some implementations, an electronic controller of the user interface 211 may be configured to manage and control the graphical user interface (GUI) displayed on the display screen and may be configured to communicate with the primary electronic controller 205 to initiate/control operation of the system 200, the receive measure impedance and/or PT/INR measurements from the primary electronic controller 205, etc. Additionally, in some implementations that include a separate electronic controller for the impedance sensor/circuit 201 and another electronic controller for the user interface 211, the system 200 may not include a "primary" electronic controller 205. Accordingly, although the examples below describe all of the system functionality as being performed by a single electronic controller 205, in various other implementations, the functionality described herein may be distributed across one or more electronic controllers.

Figure 3:
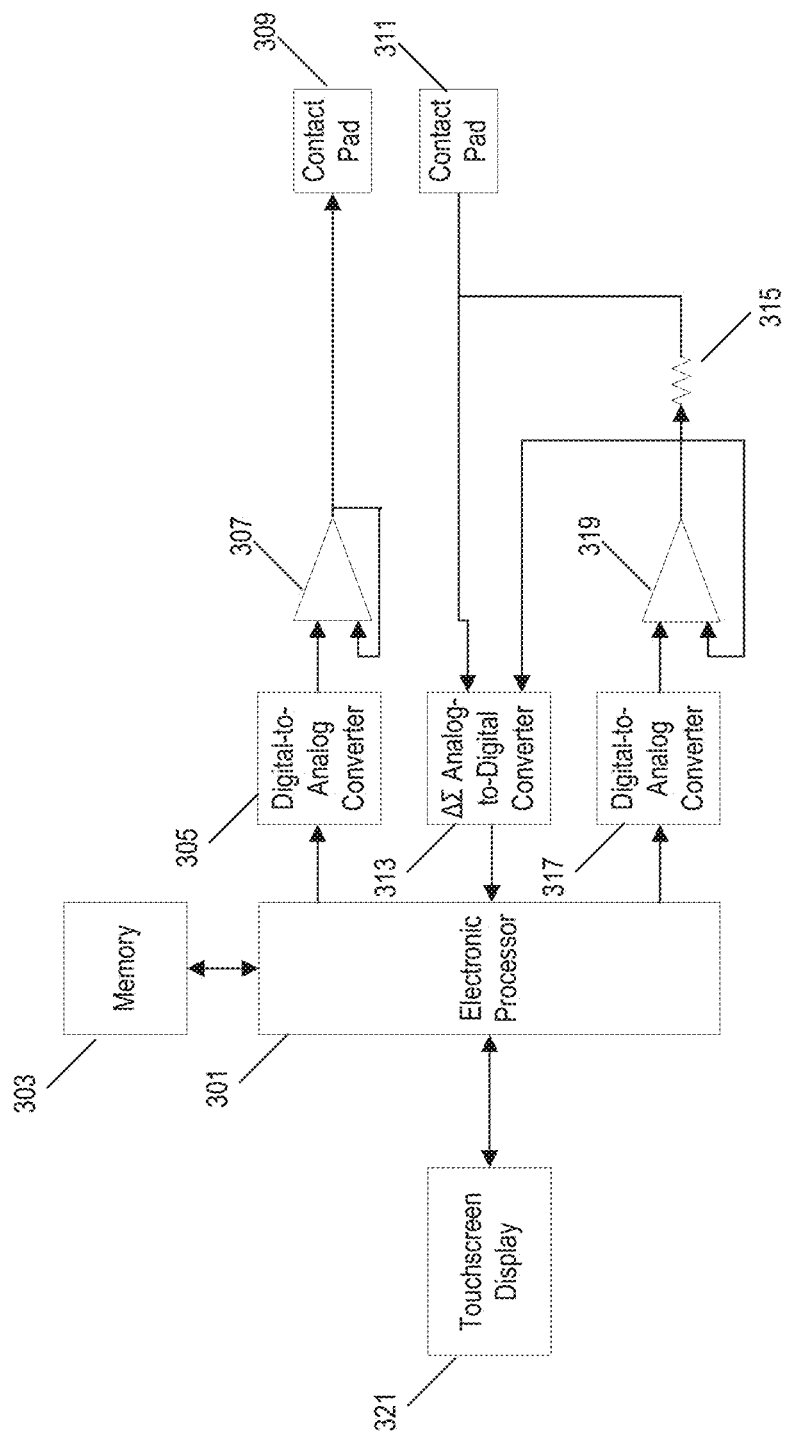
FIG. 3 is a schematic diagram of an example of a prothrombin time sensor system according to FIG. 2.

FIG. 3 illustrates a specific example of one implementation of the system 200 of FIG. 2. An electronic processor 301 executes instructions stored on a memory 303 to provide the functionality described in this example. A first on-chip digital-to-analog converter 305 is operated by the electronic processor 301 to output a 0.3 V amplitude sine wave at 15 kHz, centered at 0.5 V. This signal is buffered using an on-chip operational amplifier (op-amp) and then applied to a first contact pad 309 (e.g., contact pad 113 of the disposable chip 100 in FIG. 1). A second contact pad 311 (e.g., contact pad 117 of the disposable chip 100 in FIG. 1) is coupled to provide an output signal to a delta-sigma analog-to-digital converter 313 view a resistor divider arrangement, where the other leg of the voltage divider is coupled to a 500Ω resistor 315. The voltage at the opposite side of the resistor 315 is held at 0.5 V by a second on-chip digital-to-analog converter 317 buffered by a second on-chip op-amp 319. The impedance of the blood sample is determined based on the output signal measured by the delta-sigma analog-to-digital converter 313.

In some implementations, digital filters are implemented by the electronic processor 301 in addition to analog signal processing provided by on-chip components. In some implementations, these filters may include computing an amplitude from each signal cycle observed by the analog-to-digital converter 313, discarding the first and fourth quartiles, and enacting a running median filter on the remaining values.

In some implementations, the first digital-to-analog converter 305, the second digital-to-analog converter 317, and the delta-sigma analog-to-digital converter 313 are provided with the electronic processor 301 and the memory 303 as components of a single-chip electronic controller package configured to provide digital signal processing. In other implementations, the converters 305, 317, 313 may be provided as components of a separate digital signal processing unit configured to operate in communication with the electronic processor 301. Similarly, in some implementations, the additional circuit components (e.g., the op-amps 307, 319 and the resistor 319) may be provided as separate circuit components while, in some other implementations, some or all of these components may be incorporated into the same chip as the digital signal processing unit and/or the electronic processor 301.

Figure 4A:
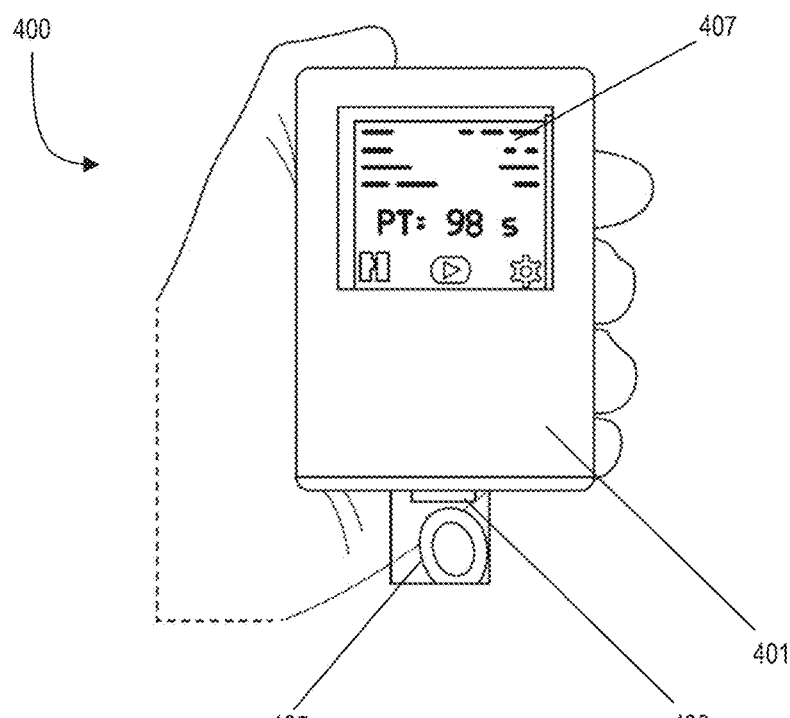
FIG. 4A is a perspective view of an example of a prothrombin time sensor system of FIG. 2 implemented as a hand-held device.
Figure 4B:
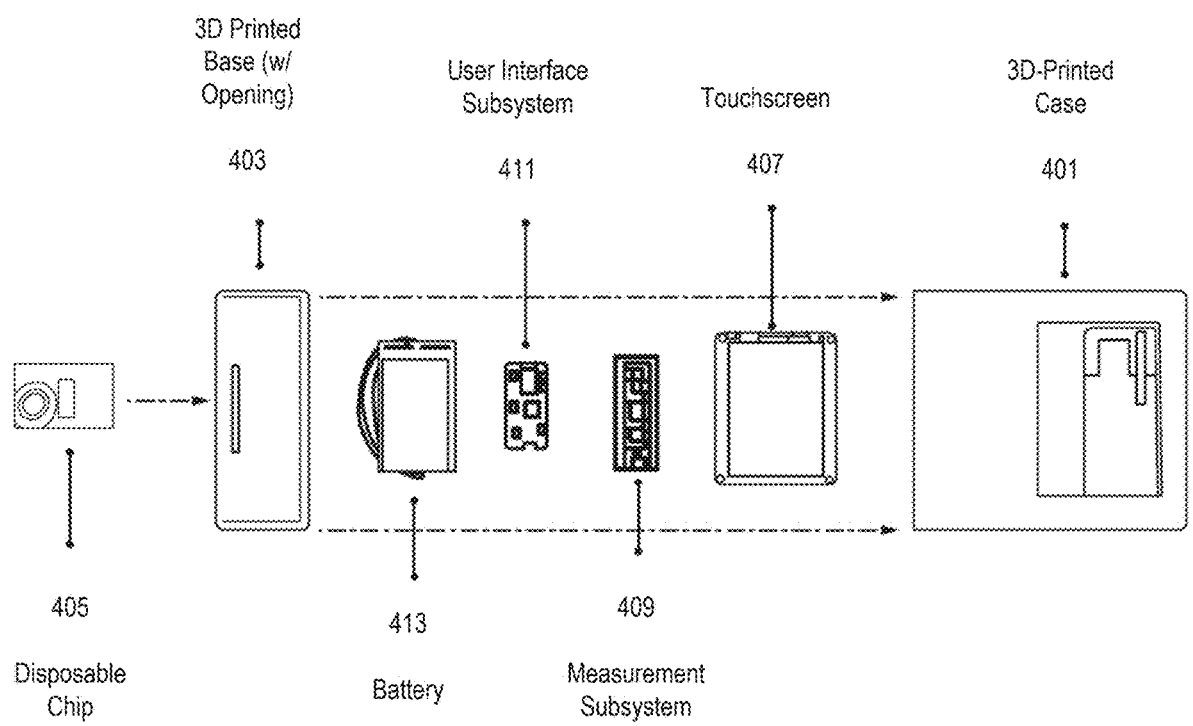
FIG. 4B is an exploded view of the hand-held device of FIG. 4A.

FIGS. 4A and 4B illustrates an example of the system of FIG. 3 implemented as a handheld device 400. The device 400 includes a plastic housing case 401 (e.g., 3D printed using an Ultimaker 3S 3D printer from Polylactic Acid (PLA)). A base 403 of the housing 401 is formed with an opening sized to receive one end of a disposable chip 405. In some implementations, the plastic housing case 401 and the base 403 are formed as a single plastic component while, in other implementations, (as illustrated in the example of FIG. 4B), the housing 401 and the base 403 are formed as separate engageable components that provide a complete housing for the handheld device 400 after assembly. The handheld device 400 also includes a touchscreen 407 that is positioned with the interactive screen accessible through an opening in the plastic housing 401 on a front surface of the plastic housing 401.

FIG. 4B illustrates the additional internal components of the handheld device 400 including a measurement subsystem 409, a user interface subsystem 411, and a battery 413. In some implementations, the measurement subsystem 409 includes the components illustrate in the example of FIG. 3 (excluding the contact pads 309, 311 and the touchscreen display 321) and, in some implementations, may be implemented as a PSoC 5LP Development Board (Cypress, USA) or similar components. The user interface subsystem 411 is communicatively coupled to the measurement subsystem and the touchscreen 407 and is configured to manage/operate the user experience (e.g., what information is displayed on the touchscreen 407 and in what manner) and initiates/controls the operation of the measurement subsystem 409 based on user inputs received through the touchscreen 407. In some implementations, the touchscreen 407 may be a TFT FeatherWing 2.4" 320×240 touchscreen (Adafruit, USA) and the user interface subsystem may be a Feather M0 Bluefruit LE development board (Adafruit, USA) or similar components. The battery 413 provides operating power to the touchscreen 407, the user interface subsystem 411, and the measurement subsystem 409 (including, for example, the electrical power used to apply the sensing current output to the disposable chip 405).

As described above, impedance of a blood sample is measured by applying an AC sensing current output to a first electrode and then detecting the resulting current signal from a second electrode while the blood sample is in contact with both electrodes (e.g., inside the well 105 of the disposable chip 100 in the example of FIG. 1). Due to varying initial impedances of different devices, in some implementations, a normalized impedance is calculated and plotted as a function of time. Plotting normalized impedance standardizes the data allowing for comparison between tests. In some implementations, normalized impedance is calculated (e.g., by the electronic processor 301 in the example of FIG. 3 or by the electronic controller in the example of FIG. 2) using the following equation:

$$I_{norm} = \frac{I_t - I_{min}}{I_{max} - I_{min}} \quad (1)$$

where $I_{norm}$ is the normalized impedance, $I_t$ is the measured impedance at a given time point, $I_{min}$ is the minimum measured impedance in the data set, and $I_{max}$ is the maximum measured impedance in the data set.

Figure 5:
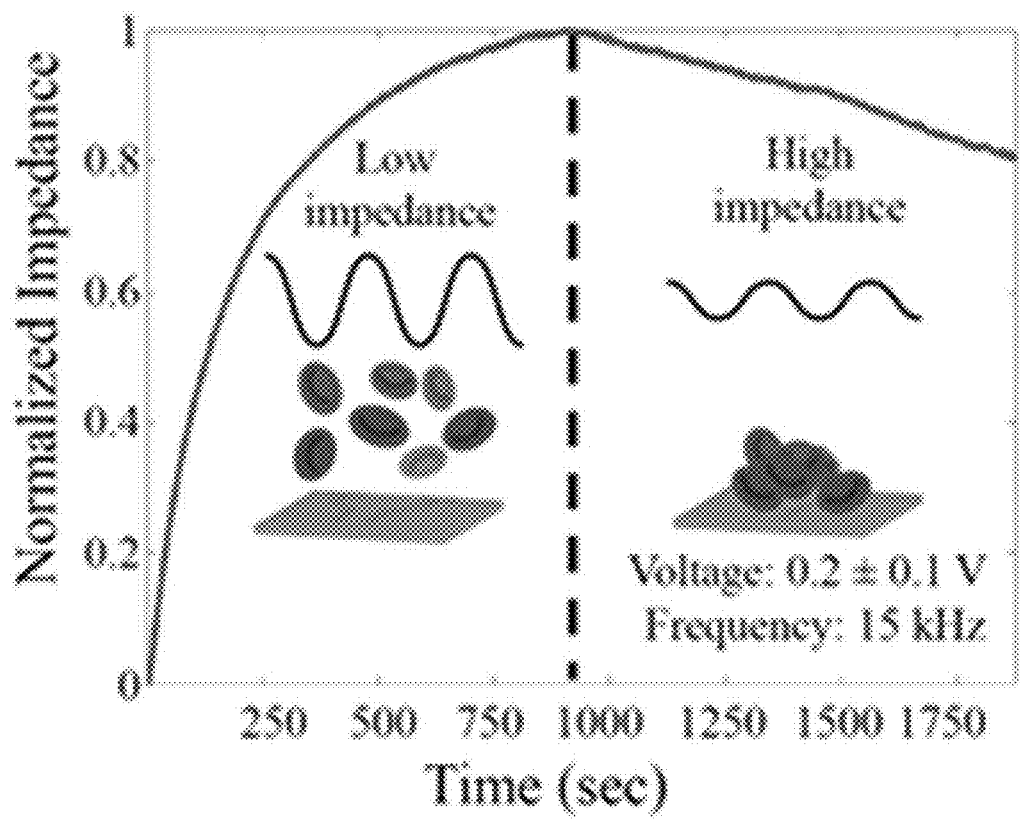
FIG. 5 is a graph illustrating an example of an impedance curve of impedance values measured by the prothrombin time sensor system of FIG. 2 as a function of time.

FIG. 5 illustrates an example of the impedance of a blood sample measured over time as the blood sample clots. In the systems described herein above, the measured impedance of the blood sample will increase as blood begins to clot. Before the blood clots, the red blood cells are floating in solution (e.g., plasma) and, therefore, the measured impedance between the electrodes printed on the surface of the substrate (i.e., the bottom surface of the well) is relatively low. As the blood clots, the red blood cells deposit onto the bottom surface of the well and cause the impedance measured between the electrodes to increase. The measured impedance maximizes at the point of clotting (i.e., the prothrombin time) before gradually decreasing. The example of FIG. 5 indicates measured impedance values for a sample of chicken blood when an AC voltage of 0.2+/−0.1 V is applied at a frequency of 15 kHz. The dashed line in FIG. 5 indicates the maximum measured impedance and, therefore, the determined prothrombin time.

Figure 6:
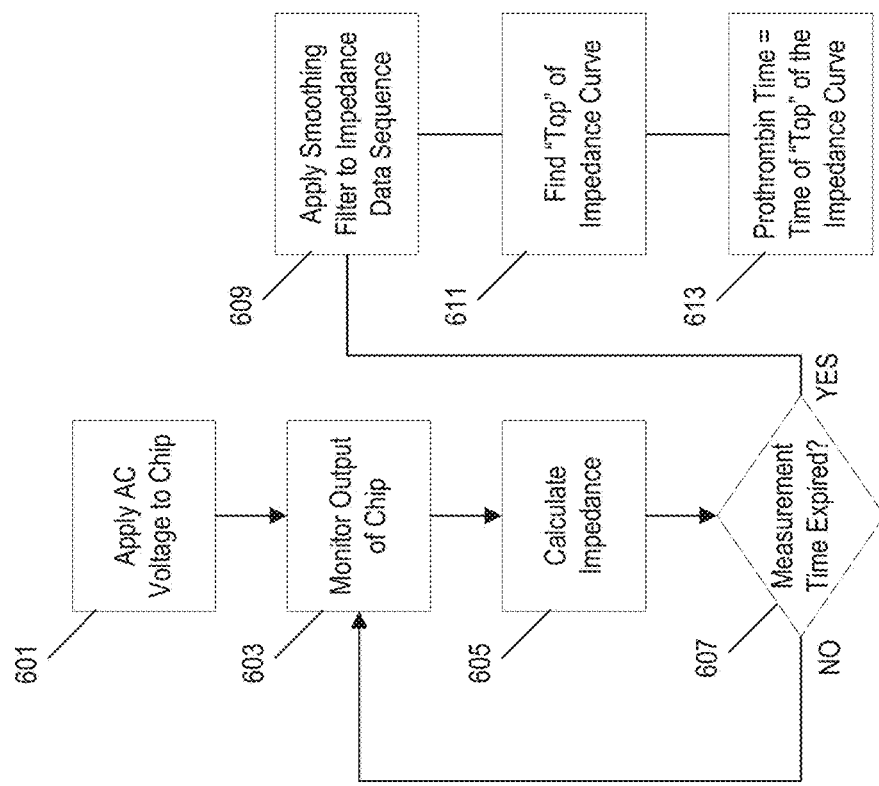
FIG. 6 is a flowchart of a first example of a method for determining the prothrombin time of a blood sample based on measured impedance values implemented by the prothrombin time sensor system of FIG. 2.

The electronic processor (e.g., electronic processor 301 in the example of FIG. 3 or electronic processor 207 in the example of FIG. 2) can be configured to identify the time corresponding to the maximum impedance of the blood sample (i.e., the prothrombin time) in various different ways. FIG. 6 illustrates a method where the system is configured to measure impedance values over a defined period of time and to then determine the prothrombin time for the blood sample after collecting the entire data set. In contrast, FIG. 7 illustrates an example in which the system is configured to monitor impedance values as then are collected and to halt impedance measurements once the prothrombin time is determined.

In the method of FIG. 6, an AC voltage signal is applied to a first electrode of a chip that is holding a blood sample (step 601) while the output signal on a second electrode of the chip is monitored (step 603) and impedance of the blood is calculated based on the measured signal from the second electrode (step 605). This process is repeated (e.g., periodically at a defined sampling frequency) until a defined measurement time period expires (step 607). After expiration of the measurement time period, a smoothing filter (and/or other data post-processing) is applied to the collected data set (step 609). The measured impedance values are then plotted as a function of time to form an impedance curve and the "top" of the curve (i.e., the maximum measured impedance value in the data set) is detected (step 611). The prothrombin time for the blood sample is then defined as the time corresponding to the impedance measurement at the top of the impedance curve (step 613) (i.e., the time corresponding to the measurement of the maximum impedance of the blood sample).

Figure 7:
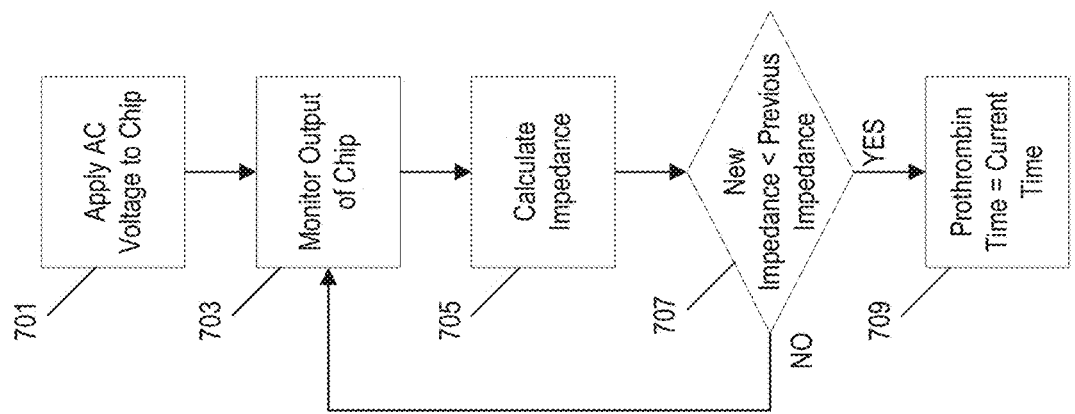
FIG. 7 is a flowchart of a second example of a method for determining the prothrombin time of a blood sample based on measured impedance values implemented by the prothrombin time sensor system of FIG. 2.

In the method of FIG. 7, the AC voltage signal is again applied to the first electrode (step 701) while the output signal is monitored on the second electrode (step 703) and the impedance of the blood sample is calculated/measured (step 705) based on the output signal on the second electrode. However, in this method, each calculated impedance value is compared to the earlier impedance values in the data set sequence to determine whether the new impedance value is less than a previous impedance value (step 707). As long as the measured impedance values continue to increase, the system continues to periodically repeat the process of measuring the impedance of the blood sample at the defined sampling rate. However, once a new impedance value is detected that is less than the previous impedance value, the system determines that the impedance is decreasing and the blood clotting has completed. In response to detecting the onset of the decreasing impedance measurements, the system determines a prothrombin time for the blood sample based on the time at which the decreasing impedance measurements was detected (step 709).

In some implementations of the method of FIG. 7, the system is configured to compare each new impedance measurement to the immediately preceding impedance measurement and to define the prothrombin time as the time corresponding to the immediately previous impedance measurement (i.e., the last "increasing" measurement) before the onset of the decrease. In other implementations, the system is configured to account for some noise-based variation in the measured impedance, for example, by comparing each new measured impedance value to one or more different preceding impedance measurements and/or by requiring the detection of a defined number of decreasing impedance measurements in sequence before halting the measurement process. For example, in some implementations, the system may be configured to continuing the impedance measurements until detecting a sequence of ten consecutive decreasing impedance measurements before halting the measurement process. Additionally, in some implementations, the system may be configured to apply post-processing and/or filtering to the data set after halting the measurement process and then determining the prothrombin time based on the smoothed/filtered data set (e.g., as in steps 609, 611, and 613 in the example of FIG. 6).

FIG. 8 illustrates an example of a method of manufacturing the sensor chip 100 (e.g., the disposable slide). Before printing the electrical circuit components, all substrates are cleaned (step 801) by ultrasonicating in acetone for 5 minutes, rinsing with deionized (DI) water, and drying using nitrogen. Then the substrates were ultrasonicated in isopropyl alcohol (IPA) for 5 minutes, rinsed with DI water, and dried with nitrogen.

Silver nanoparticles (AgNP) traces were then printed as the conducting electrodes and contact pads (step 803). FIG. 9A illustrates this step showing a printing nozzle 903 dispensing the silver nanoparticle (AgNP) ink 905 on a glass substrate 901 to form a circuit pattern 907. The circuit pattern 907 formed in this step includes the electrodes 107, 109, the conductive traces 111, 115, and the contact pads 113, 117 as illustrated in the example of FIG. 1. The AgNP ink in this example was prepared by mixing commercial AgNP solution (Ag40x, UT Dots, Inc., USA) with terpinol in a 9:1 ratio to optimize the viscosity for ease of printing and to achieve small line widths. The ultrasonic atomizer mode of an Optomec AJ300 printer was used for printing. 1 mL of the prepared AgNP ink was added to the aerosol jet (AJ) printer and printed using a 150 μm nozzle. The platen temperature was held at 60° C. during printing, while a sheath gas flow rate of 25 SCCM, an atomizer gas flow rate of 20 SCCM, and an ultrasonic atomizer current of 350 mA were used to print the conductive traces. A print speed of 8 mm/s was used for all AgNP printing. After printing, the AgNP traces were annealed in an over at 200° C. (step 805) for one hour to increase conductivity. In this example, a spacing of 150 μm between the two electrodes was selected for ease of printing.

In order to avoid electrical current measurement range limitations of the computer-tied measurement system used in this experiment, a resistive bridge was printing using either silver nanowires (AgNWs) or unsorted carbon nanotubes (CNTs) (step 807). These inks were selected because of their relatively high conductivity and ease of fabrication with an AJ printer. Neither the AgNWs nor the unsorted CNTs required any post-processing to achieve high conductivities. In experiments using AgNWs, high aspect ratio AgNWs (2-6 μm long and 30-50 nm in diameter) were synthesized using the polyol method. 1 mL of AgNW ink was added to the ultrasonic atomizer of an Optomec AJ300 and a 200 μm nozzle was used. The platen temperature was held at 80° C. during printing of the resistive bridge and a sheath gas flow rate of 40 SCCM, an atomizer gas flow rate of 40 SCCM, and an ultrasonic atomizer current of 350 mA were used. In experiments using CNTs, P3 single-walled unsorted CNTs (Carbon Solutions Inc, USA) were suspended in water at a concentration of 0.1 mg/mL. 1 mL of CNT ink was added to the ultrasonic atomizer of an Optomec AJ300 using a 150 μm nozzle. The platen temperature was held at 50° C. during printing of the resistive bridge and a sheath gas flow rate of 25 SCCM, an atomizer gas flow rate of 40 SCCM, and an ultrasonic atomizer current of 350 mA were used. FIG. 9B illustrates this step of the fabricating process where the nozzle 903 dispenses the AgNW/CNT ink 909 onto the surface of the glass substrate 901 to form the resistive bridge 911.

Finally, a silicon well gasket is affixed to the surface of the glass slide to create a well to contain all liquid volumes during testing at a location including the terminal ends of the AgNP electrodes printed on the surface of the glass substrate. FIG. 9C illustrates the placement of the silicon well gasket 913 on the glass substrate 901 relative to the printed circuit components. The volume of liquid that can be held on the chip during impedance measurements can be varied by adjusting a diameter and/or shape of the well and by adjusting a thickness of the silicon gasket 913. Additionally, although the example of FIGS. 9A through 9C (and other examples described herein above) show only a single set of electrodes and a single sample well on the sensor chip, in other implementations, a plurality of sensors can be formed on a single substrate. The substrate can then be cleaved as part of the fabrication process to form multiple different sensor chips. Alternatively, in some implementations, the final component may include multiple different "wells" on the same substrate/chip such that multiple blood samples can be tested concurrently. In some such systems, the device containing the impedance measurement subsystem (e.g., the handheld device of FIG. 4A would be altered to receive the multi-well chip and to selectively connect to each individual pair of electrodes on the multi-well chip one-at-a-time or, in some other such systems, the device would be configured to concurrently couple to all electrodes on the multi-well chip to perform concurrent impedance measurements of multiple different blood samples.

Disposable chip fabricated according to the method of FIG. 8 (and as described above) were used to measure prothrombin time for a sample of chicken blood and for a sample of human blood. For the chicken blood samples, all reagents were stored in a refrigerator at 4° C. before use and removed directly before measurement to ensure all reagents were at the same temperature during testing, as clotting time may be affected by blood temperature. A PalmSens 3600 analyzer, which has a minimum detection current of 1 mA for impedance measurements, was used as a driver and as a measurement unit. 250 μL of K2-ethylenediaminetetraacetic acid (EDTA) chelated whole chicken blood (Innovative Research, USA) was added to a vial, along with 500 μL of Dade Innovin Derived Fibrinogen (Siemens, USA) human clotting factor, and 3 mM of Ca2+ in the form of an aqueous calcium chloride solution. The vial was shaken for 5 seconds to mix thoroughly and 100 μL of solution was added to the device well. Then an AC 0.2+/−0.1 V voltage was applied to the disposable chip and the impedance response was monitored for 2000 seconds to observe a clotting response.

Similarly, for the human blood samples, all reagents were stored in a refrigerator at 4° C. before use and removed directly before measurement. Before any liquid was added to the well of the disposable chip, voltage was applied to the device. 66 μL of Dade Innovin Derived Fibrinogen (Siemens, USA) human clotting factor and 3 mM Ca2+ were added to the well and allowed to settle for 30 seconds. Afterward, 33 μL of single donor whole human blood (Innovative Research, USA) was added to achieve a total volume of 100 μL in the well. A AC voltage of 0.2+/−0.1 V was applied to the disposable chip, and the impedance response was continuously monitored for a clotting response for a total of 300 seconds.

The ability of the device to determine the impedance maximum with precision is key. Moreover, given that a normal prothrombin time for humans is less than a minute, a sharp signal and a defined impedance maximum are also required for accurate measurement. To determine an optimal frequency for maximizing impedance response during a clotting event, a frequency sweep was performed from 50 kHz to 1 kHz once every 60 s over the course of a clotting test with the chicken blood. The chicken blood clotting time occurred at roughly 1000 s during this test and the impedance response is similar over the majority of the frequency range, indicating that prothrombin time can be accurately measured over a broad frequency range. However, in this particular experiment, we were unable to observe a distinct impedance maximum below 10 kHz nor a shift in capacitor time constants, and thus observed no signal response to clotting. In contrast, a distinct impedance maximum was observed in consistent fashion for all frequencies at or above 10 kHz all the way to 50 kHz.

The 10 kHz minimum frequency limit is attributed to the ionic capacitance of the blood. At frequencies below 10 kHz, the capacitive response of the blood increases in an inverse power relation, which overwhelms the impedance response of the clotting event, nullifying the test. Conversely, blood is dispersive when higher frequencies are applied, meaning that its dielectric properties become frequency dependent. At high enough frequencies (MHz range), the dielectric constant of blood decreases precipitously, which would obscure the clotting event due to the relatively low impedance from the settling of red blood cells and plasma displacement. Accordingly, in some implementations, the system is configured to detect prothrombin time for a blood sample by measuring impedance at an operating frequency that is greater than 10 kHz and less than 1 MHz. Furthermore, in some implementations, the system is configured to measure impedance of the blood sample at an operating frequency of 15 kHz.

As previously mentioned, AgNWs and/or CNTs were printed as a resistive bridge to increase the baseline signal to within the range of measurement. The resistor bridge also increases the background current of the device, thus eliminating the need to measure ultralow currents that are outside of the measurement range of mid-priced impedance sensing platforms, such as the PalmSense3, which has a minimum limit of detection for impedance spectroscopy of 1 mA. In printing the resistive bridge, the resistance must be tuned appropriately. While the resistance must be lower than 200Ω across the gap, it must also be high enough to detect a clotting signal. This testing revealed that at initial impedance values lower than 50Ω, only a small fraction of the devices functioned. The high background conductivity of the resistive bridge occludes the impedance modulation caused by the coagulation effect. Thus, the device behaves as a blank and no clotting effect can be measured.

Multiple tests at various initial impedance values were performed to test the device functionality and repeatability within this determined 50-200Ω window. Based on these tests, the initial impedance value does not affect the time at which the impedance maximum is observed, and thus does not interfere with the clotting time measurement. Intuitively, this finding is understandable, as the initial impedance value measures the resistive bridge, whereas the impedance maximum measures a magnitude change due to the deposition of RBCs. In addition, the curvature of the impedance plots both before and after the clot time vary from device to device, but we have found that this does not affect the measured clot time.

In order to make a truly viable POCT PT/INR test, the single-use measurement chip must be disposable and thus low-cost and robust. Fabricating a robust chip decreases the likelihood of damage during both transportation and operation. In some implementations, to fabricate a robust POCT PT/INR device, 125 µm thick Kapton polyimide film is used due to its innate flexibility and history as a robust substrate for flexible, printed electronics. Clotting tests were performed on devices fabricated on a polyimide film and compared to results from a glass slide. The results indicated that Kapton-based devices in an unstrained state performed consistently, indicating both that the use of a polyimide film as a robust substrate has no negative impact of the clotting time nor on the ability to measure an impedimetric change. To further test the flexible device, a clotting test of a printed biosensor on polyimide under a strained state with a 35 mm bend radius was performed. This resulted in a measured clotting time consistent with a clotting time measured using a device fabricated on a glass slide. Furthermore, the results from the bending test demonstrate that a bent device provides identical performance to an unstrained device, provided that the bend radius is large enough.

While large bending radii do not cause issues with testing, errors may arise at smaller bending radii. While there is no observable change to the PT/INR when the device is bent to a set radius before the beginning of a test, use cases that involve large modifications to the bending radius during testing could add sufficient impedimetric noise, due to the resistance change in the printed trace, to obscure the clotting result. An additional potential for error with bending could be blood pooling away from the device electrodes. If the device is flexed to a small enough bend radius in a tensile state (substrate bent away from the device), the RBCs may pool at the edges of the well and deposit away from the device electrodes. This pooling would obfuscate the clotting result, as the impedimetric measurement responds to deposition of the RBCs directly on and between the electrodes. If a large fraction of the blood deposits away from the electrodes, the deposited volume of RBCs over the electrode may not be voluminous enough to accurately measuring the clotting event. On the other hand, if the device was bent in a compressive manner around the device, the blood would most likely pool directly onto the electrodes, which would have no negative effects.

Finally, with the addition of a flexible component, this chip has the potential for incorporation into a wearable medical device akin to the wristband smartwatch, which is largely unused real estate. With this incorporation, a PT/INR POCT has the potential for integration into a consumer electronic device, which could have a revolutionary impact on PT testing by allowing for a low-cost and low-effort testing platform that could facilitate testing with almost no decrease in quality of life caused by trips to an outpatient clinic.

While testing the device with chicken blood enabled device development and validation of functionality, further tests were performed in order to determine whether the impedimetric response of the device performed similarly with human blood. The normal clotting time for fresh, whole human blood is on the order of 5-8 minutes (Lee and White, 1913). To reduce measurement time, PT tests using the systems and methods described above were performed on human blood by adding a clotting agent (e.g. Innovin clotting agent) to previously anticoagulated blood (i.e., in which anticoagulation agents were added to the blood sample at the time of draw). The coagulation time in a PT test on such anticoagulated blood is on the order of seconds to tens of seconds, which is substantially faster than the 900-1000 seconds for chicken blood.

The error inherent to the procedure developed for chicken blood (mixing the reagents offline, then adding an aliquot of the mixture to the device well) is on the order of ten seconds (~1% of the PT for chicken blood), which is similar to the full prothrombin time for anticoagulated human blood. Thus, a new procedure was developed to decrease the measurement error for human blood. The impedance measurement was started without any solution on the device, then 66 μL of Innovin and 0-3 mM calcium were added sequentially to the well and allowed to stabilize for 30 seconds. Finally, 33 μL blood was added to the well and the impedance was monitored for another 200 seconds. These volumes were selected to achieve a total addition of 100 μL of liquid to the device. Adjustments to the device and/or the process (such as, for example, adjusting the size of the wells on the sensor chip, the types of reagents, and/or the relative proportions of the reagents) can decreases the required blood volume down towards the ~3 μl of blood that is collected by the average finger prick. Mixing will occur during the application of the blood due to the small total volume of reactants and the agitation energy from pipetting in the blood. This mixing was enough to give highly repeatable clotting results with a standard deviation of 0.2% for chicken blood (less than 2 seconds).

Given that the clotting time for recombinant tissue factor induced coagulation of K2-EDTA anticoagulated human blood is significantly more rapid than that of chicken blood, further experimentation was required to ensure that the impedance maximum corresponded to the clot time as opposed to an impedance modulation caused by the addition of the blood. Four concentrations of calcium were tested (0, 45, 90, and 110 mM) to explore the impact on PT. All blood tested was anticoagulated with K2-EDTA, which chelates divalent calcium cations and, through this chelation, prohibits the coagulation pathway from progressing. The addition of calcium back into the solution overwhelms the chelating ability of the K2-EDTA and thus allows the progression through the coagulation pathway with the addition of Dade Innovin human clotting factor. There is a linear correlation between activated partial thromboplastin time and calcium concentration, an inverse power relationship between activated clotting time and calcium concentration, and a parabolic and decreasing relationship between the PT and calcium. Each of these relationships demonstrate that varying the calcium concentration can alter the kinetics of the clotting reaction. We observed a decreasing, linear relationship between the calcium concentration and the clotting time in the calcium concentrations tested with anticoagulated human blood. The linear relationship indicates that, even at the short clot times associated with PT, this printed biosensor is highly sensitive and accurate, thus demonstrating a correlation between calcium concentration and clotting time over multiple detection methods.

The examples described above utilize the addition of clotting agents at the time of testing and anticoagulation at the time of draw. In some implementations, the sensor chip and/or the device coupled thereto may be configured to include microfluidic mechanisms to automatically dispense appropriately metered amounts of the various reagents during testing to further simplify the testing/measurement process for point-of-care use. Alternatively, in some other implementations, the system may be configured to measure impedance using raw blood (e.g., collected by the patient using a "finger prick" mechanism) without the addition of any reagents. However, because the time required for raw human blood to coagulate can be significantly higher, the time period over which the device would be configured to periodically measure impedance of the blood would be similarly longer.

From these PT measurements, the INR of a patient can be calculated. Given that different laboratories may have slightly different reagents and procedures, this may lead to variations in recorded PT. Hence, INR is used to ensure that deviations in measured PT are due to a shift in the patient's coagulation time as opposed to differences in operating procedures. INR is determined using the following formula:

$$INR = \left(\frac{PT_{patient}}{PT_{norm}}\right)^{ISI}$$

where $PT_{norm}$ is the average clotting time for a healthy population, $PT_{patient}$ is the measured clotting time for the patient, and the international sensitivity index (ISI) is a function of the thromboplastin reagent. This equation assumes that all reagents are maintained at a constant 37° C. during testing. There is a strong correlation between PT and reagent temperature which could greatly affect INR and, correspondingly, treatment plans if the patient's blood and the reagents are tested at a non-standard temperature. In addition, a difficult or traumatic phlebotomy could increase coagulation and provide false readings. Given these variables, standardization in measurement conditions could lead to errors if not properly controlled.

Accordingly, the systems and methods described above provide, among other things, a fully-printed biosensor for low-cost POC measurement of PT/INR. In some implementations, the testing frequency of the device is set to 15 kHz while, in other implementations, the testing frequency may be set to a frequency within the range of 10 kHz to 1 MHz. in some implementations, the inclusion of a printed resistive bridge on the biosensor enhances the baseline signal, which enabled significant reduction in the cost of the testing platform, allowing for characterizing the sensors with a simple, low-cost device analyzer. An initial impedance magnitude between 50 and 200Ω ensured the signal from the clotting event was not masked or too weak for detection. In some implementations, flexible, robust devices fabricated on a polyimide surface were shown to measure the same clotting time as on a glass slide, even when the polyimide surface was bent to a radius of 35 mm. Additional features and advantages of the invention are set forth in the following claims.

What is claimed is:

1. A sensor chip for use in measuring a prothrombin time of a blood sample, the sensor chip comprising:
   a substrate; and
   a circuit arrangement formed of one or more conductive ink materials printed on a surface of the substrate, the circuit arrangement including
   a pair of electrodes including a first electrode and a second electrode,
   a pair of contact pads including a first contact pad and a second contact pad, and
   a plurality of conductive traces electrically coupling the first electrode to the first contact pad and electrically coupling the second electrode to the second contact pad, wherein the sensor chip is configured to measure an impedance of a blood sample placed on the sensor chip in contact with both the first electrode and the second electrode, and wherein the pair of electrodes, the pair of contact pads, and the plurality of conductive traces are formed of a silver nanoparticle material printed on the surface of the substrate as a silver nanoparticle ink using aerosol jet printing.

2. The sensor chip of claim 1, further comprising a resistive bridge printed on the surface of the substrate electrically coupling the first contact pad to the second contact pad, wherein the resistive bridge is formed of a different conductive ink material than the conductive ink material used to print the pair of contact pads.

3. The sensor chip of claim 2, wherein the resistive bridge is printed on the surface of the substrate using at least one selected from a group consisting of a silver nanowire ink and a carbon nanotube ink.

4. The sensor chip of claim 2, wherein the resistive bridge is configured to establish an initial impedance between the first contact pad and the second contact pad of between 50Ω and 200Ω without the blood sample applied to the electrodes.

5. A prothrombin time measurement system comprising:
an impedance sensor selectively coupleable to the sensor chip of claim 1, wherein the impedance sensor is configured to measure an impedance of the blood sample positioned on the pair of electrodes by measuring an impedance between the pair of contact pads; and
an electronic controller configured to
capture an impedance data set including a sequence of impedance measurements of the blood sample measured by the impedance sensor over a period of time,
determine a maximum impedance value from the impedance data set, wherein the maximum impedance value is indicative of complete clotting of the blood sample,
determine a measurement time associated with the determination of the maximum impedance value, and
determine the prothrombin time for the blood sample based on the measurement time corresponding to the maximum impedance value.

6. The prothrombin time measurement system of claim 5, wherein the impedance sensor is configured to measure the impedance of the blood sample at a defined operating frequency of 15 kHz.

7. The prothrombin time measurement system of claim 5, wherein the impedance sensor is configured to measure the impedance of the blood sample at a defined operating frequency between 10 kHz and 1 MHz.

8. The prothrombin time measurement system of claim 7, wherein the impedance sensor includes:
an AC signal source coupled to the first contact pad and configured to apply an AC signal as a sine wave at the defined operating frequency;
a reference voltage source coupled to the second contact pad through a resistor and configured to apply a reference voltage on a first end of the resistor, wherein the first end of the resistor is opposite a second end of the resistor that is coupled to the second contact pad; and
an analog-to-digital converter coupled to the second contact pad and to the reference voltage source, wherein the impedance sensor is configured to determine an impedance between the pair of contact pads based on an AC output signal measured from the second contact pad and the reference voltage source.

9. The prothrombin time measurement system of claim 8, wherein the AC signal source is configured to apply the AC signal as a 0.3 V amplitude sine wave at 15 kHz centered at 0.5V, and wherein the reference voltage applied by the reference voltage source is 0.5V.

10. The prothrombin time measurement system of claim 5, further comprising:
a handheld plastic housing case;
an exterior opening in the handheld plastic housing case, the opening sized to selectively receive an edge of the sensor chip; and
a coupling interface positioned proximal to the exterior opening and configured to engage the first contact pad and the second contact pad of the sensor chip when the sensor chip is inserted into the exterior opening, wherein the engagement of the coupling interface to the first contact pad and the second contact pad electrically couples the impedance sensor to the first contact pad and the second contact pad of the sensor chip.

11. The prothrombin time measurement system of claim 5, wherein the electronic controller is configured to calculate a normalized impedance value of the blood sample at each of a plurality of impedance measurements from the impedance sensor, wherein the impedance data set includes a sequence of the normalized impedance measurements, wherein the electronic controller is configured to calculate each normalized impedance value as:

$$I_{norm} = \frac{I_t - I_{min}}{I_{max} - I_{min}}$$

wherein $I_{norm}$ is the normalized impedance, $I_t$ is the measured impedance at a given measurement time t, $I_{min}$ is the minimum impedance measured by the impedance sensor over the period of time, and $I_{max}$ is the maximum impedance measured by the impedance sensor over the period of time.

12. A method of measuring a prothrombin time using the sensor chip of claim 1, the method comprising:
applying a blood sample to the sensor chip such that the blood sample is in contact with both electrodes of the pair of electrodes;
repeatedly measuring an impedance of the blood sample by measuring an impedance between the first contact pad and the second contact pad;
generating an impedance data set based on the measured impedance, wherein the impedance data set includes a sequence of chronologically ordered impedance values based on the measured impedance of the blood sample at each of a plurality of different measurement times;
analyzing the impedance data set to identify an impedance value corresponding to a top of an impedance curve, wherein the impedance curve includes a plurality of increasing impedance values while the blood is coagulating and a plurality of decreasing impedance values after the blood has coagulated, wherein the top of the impedance curve is indicative of a completion of clotting; and
determining the prothrombin time for the blood sample based on a measurement time corresponding to the impedance value at the top of the impedance curve.

13. The method of claim 12, further comprising selectively and interchangeably coupling the sensor chip to a handheld point-of-care impedimetric coagulometer, wherein the handheld point-of-care impedimetric coagulometer is configured to repeatedly measure the impedance between the first contact pad and the second contact pad.

14. The sensor chip of claim 1, wherein the substrate includes a glass substrate.

15. The sensor chip of claim 1, wherein the substrate includes a flexible polyimide substrate.

16. A method of manufacturing a sensor chip for use in measuring a prothrombin time of a blood sample, the sensor chip comprising:
   a substrate; and
   a circuit arrangement formed of one or more conductive ink materials printed on a surface of the substrate, the circuit arrangement including
   a pair of electrodes including a first electrode and a second electrode,
   a pair of contact pads including a first contact pad and a second contact pad, and
   a plurality of conductive traces electrically coupling the first electrode to the first contact pad and electrically coupling the second electrode to the second contact pad,
   wherein the sensor chip is configured to measure an impedance of a blood sample placed on the sensor chip in contact with both the first electrode and the second electrode, and wherein the pair of electrodes, the pair of contact pads, and the plurality of conductive traces are formed of a silver nanoparticle material printed on the surface of the substrate as a silver nanoparticle ink using aerosol jet printing, the method comprising:
   cleaning and preparing the surface of the substrate;
   printing the pair of electrodes, the pair of contact pads, and the conductive traces on the prepared surface of the substrate using a first conductive ink material, wherein the printing with the first conductive ink material is performed using aerosol jet printing; and
   printing a resistive bridge on the prepared surface of the substrate using a second conductive ink material, wherein the resistive bridge electrically couples the first contact pad to the second contact pad, wherein the second conductive ink material is a different conductive ink material than the first conductive ink material, wherein the printing with the second conductive ink material is performed using aerosol jet printing.

17. The method of claim 16, wherein the first conductive ink material includes a silver nanoparticle (AgNP) ink, the method further comprising sintering the sensor chip after printing with the first conductive ink material and before printing with the second conductive ink material.

18. The method of claim 17, wherein printing the resistive bridge using the second conductive ink material includes printing the resistive bridge using at least one selected from a group consisting of a silver nanowire ink and a carbon nanotube ink.

19. A sensor chip for use in measuring a prothrombin time of a blood sample, the sensor chip comprising:
   a substrate; and
   a circuit arrangement formed of one or more conductive ink materials printed on a surface of the substrate, the circuit arrangement including
   a pair of electrodes including a first electrode and a second electrode,
   a pair of contact pads including a first contact pad and a second contact pad, and
   a plurality of conductive traces electrically coupling the first electrode to the first contact pad and electrically coupling the second electrode to the second contact pad, wherein the sensor chip is configured to measure an impedance of a blood sample placed on the sensor chip in contact with both the first electrode and the second electrode, and
   wherein the sensor chip further comprises a resistive bridge printed on the surface of the substrate electrically coupling the first contact pad to the second contact pad, wherein the resistive bridge is formed of a different conductive ink material than the conductive ink material used to print the pair of contact pads.

* * * * *